Aug. 11, 1953     J. FEATONBY     2,648,191
HEAT POWER REACTOR

Filed Aug. 20, 1951     2 Sheets-Sheet 1

INVENTOR
JOSEPH FEATONBY
BY
ATTORNEY

Aug. 11, 1953   J. FEATONBY   2,648,191
HEAT POWER REACTOR

Filed Aug. 20, 1951   2 Sheets-Sheet 2

INVENTOR
JOSEPH FEATONBY
BY
ATTORNEY

Patented Aug. 11, 1953

2,648,191

UNITED STATES PATENT OFFICE 2,648,191

HEAT POWER REACTOR

Joseph Featonby, Ottawa, Ontario, Canada, assignor to National Research Council, Ottawa, Ontario, Canada, a body corporate of Canada Application August 20, 1951, Serial No. 242,680

5 Claims. (Cl. 60—35.6)

This invention relates to the control of the exhaust system of a heat power reactor.

More particularly, the invention relates to a reactor having means for automatically varying the effective flow area of the gas discharge opening as a function of the temperature of the exhaust system. By the term "reactor" as used in the specification and claims I mean any gas or steam turbine or propulsive jet in which it is advantageous to change the discharge opening or discharge flow area to improve power or efficiency. By the term "discharge opening" as used in the specification and claims I intend to include nozzles and diffusers.

A reactor may comprise one or more compressors, a combustion chamber or chambers receiving the air from the compressor, a gas turbine or turbines receiving the expanding gases of combustion from the chambers and serving to drive the compressor or compressors, usually a second combustion chamber in which takes place a supplemental fuel injection, resulting in "afterburning," and a nozzle arrangement for discharging the gases in the form of a reactive propulsive jet.

Under conditions requiring large values of thrust such as in aircraft take-off, climbs or high speeds, additional fuel may be burned and unless the area of the discharge flow nozzle is thereupon promptly increased, this increase in heat supply results in an increase in the back pressure of the turbine, a decrease in the turbine speed and in the compressor speed and a failure to deliver the desired thrust.

Similarly should the exhaust static pressure of a reactor be subatomspheric the back pressure on the reactor would be reduced by increasing the flow area of the discharge opening in relation to that of the exhaust duct or tube i. e. forming a diffuser.

The need for means that would furnish a prompt and automatic response whenever a variation in the area of the discharge flow opening was called for, became apparent at an early date in the development of reactors.

The means at present used for varying the flow area of the discharge opening depend upon an elaborate system of controls with a substantial number of moving parts, whereby the desired variation is obtained mechanically or through the medium of pressure exerted by a fluid operating on a piston or similar device. Some such controls are not automatic. All are exposed to the danger of failure inherent in such mechanisms.

In addition it is difficult to devise regulating mechanism of the type required for the above controls that will stand up under the extremely high temperature conditions of heat power reactors.

In short the design of a discharge nozzle having a variable flow area along the lines heretofore pursued presented many difficulties which have not yet been overcome.

In heat power reactors, if the mass flow remains constant the discharge flow area should increase as the square root of the absolute temperature of the gas. Since the required increase, for instance, in the discharge flow area is a function of the temperature rise of the burning fuel and, in turn, of the temperature rise of the exhaust duct or tube, it is an advantage to have a variable discharge flow area, operable by means of the temperature rise.

Furthermore in my invention numerous jointed controls or other complicated apparatus are not needed.

According to the invention, members may be disposed adjacent the discharge end of the exhaust duct to control the flow area of the orifice through which finally the stream of gases may pass to atmosphere, and the position of such member is automatically varied as a function of the expansion or contraction of the exhaust duct in response to variations in the temperature of the gases. The position of the members thus determines the effective flow area of the discharge opening.

In the forms of the invention shown herein, members are pivotally supported so as to be angularly displaceable.

The principal object of this invention, therefore, is to provide efficient and dependable means for automatically varying the effective flow area of the discharge opening of a reactor as a function of the variations in the temperature of the gases being discharged therethrough. Under some conditions, such as at altitude, a further control will be necessary where the discharge flow area is too large due to the high temperature of the exhaust duct. Providing a controlable coolant flow over the surfaces of the exhaust duct, is one way of reducing the discharge flow area. In starting, of course, no coolant would be used as a rapid increase in the discharge flow area is desirable.

In order to accelerate the speed of operation of the invention by inducing more rapid expansion of the exhaust duct, the hot gases can be caused by various conventional means to flow along the outer surface of the exhaust duct.

A specific object is to automatically vary the effective discharge opening of the heat power reactor by utilizing the expansion or contraction of the exhaust duct in response to variations in the temperature of the exhaust gases. Members forming walls of the exhaust duct are displaced in response to variations in the temperature of the exhaust gases. The flow of the stream is controlled by varying the effective discharge opening.

In the drawings, wherein like numerals of reference indicate corresponding parts in the various figures, Figure 1 is a fragmentary elevation (parts being broken away) showing a form of the invention;

Figure 1:
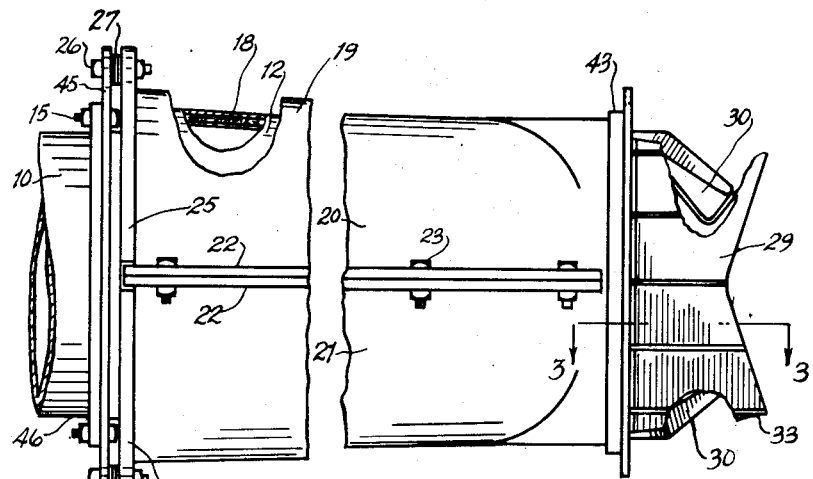

Referring now by numerals to the drawing, first to Figures 1 to 4, Figure 1 is a typical exhaust duct or tube shown (in part only) including a tube 10. This tube is connected to a transition duct 11 through which gases flow to a nozzle or diffuser formed by movable members 30 and walls 29. In the present instance, the nozzle arrangement as shown is made of metal.

As shown, the transition duct is formed to present a forward portion 12 of circular cross-section, which merges into a rearward portion 13 of rectangular cross-section. The forward circular portion is affixed to the inside edge of a ring 14, which in turn is affixed to the vertical face of a ring 45. The transition duct as shown is connected to the exhaust duct 10 by bolts 15 passing through both the ring 45 and flange 46 of the exhaust duct. Fastened to the rear portion 13 of the transition duct 11, adjacent its rearward end, is a frame 17. The material of the frame 17 is preferably so chosen that it has about the same coefficient of thermal expansion as the material of the transition duct.

Surrounding the transition duct 11, and in spaced relationship therewith, is an outer tube 19. The tube is also formed to present a forward circular portion and a rearward rectangular portion. Secured to the outer face of the transition duct 11 is insulation 18 to prevent, as much as possible, the passing of heat through the wall of the transition duct 11 to the outer tube 19.

As shown, the tube 19 is formed of two complementary sections or segments 20 and 21, respectively, having flanges 22 adapted to be secured together, as by bolts 23. This is to facilitate assembly and to improve accessibility.

Attached to the sections 20 and 21 are two half rings 25, which serve to secure the outer tube 19 in operative position to the exhaust duct at the ring 45 as by bolts 26. The half rings 25 preferably bear against shims 27, so that the longitudinal position of the outer tube 19 with respect to the exhaust duct may be adjustably set within a certain range.

Extending rearwardly from the rectangular portion of the transition duct 11 are members or walls 29 presenting parallel flat surfaces, forming a continuation of the walls of the rectangular portion of the transition duct.

Figure 3:
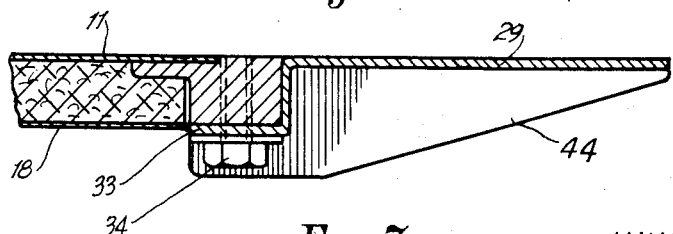
Figure 3 is a section on line 3—3 in Figure 1, on an enlarged scale, the outer shell being omitted.

As best seen in Figure 3, the wall 29 may include a flange 33 adapted to overlie the frame 17, to which it is secured, as by studs 34. Ribs 44 serve to reinforce the wall.

Figure 2:
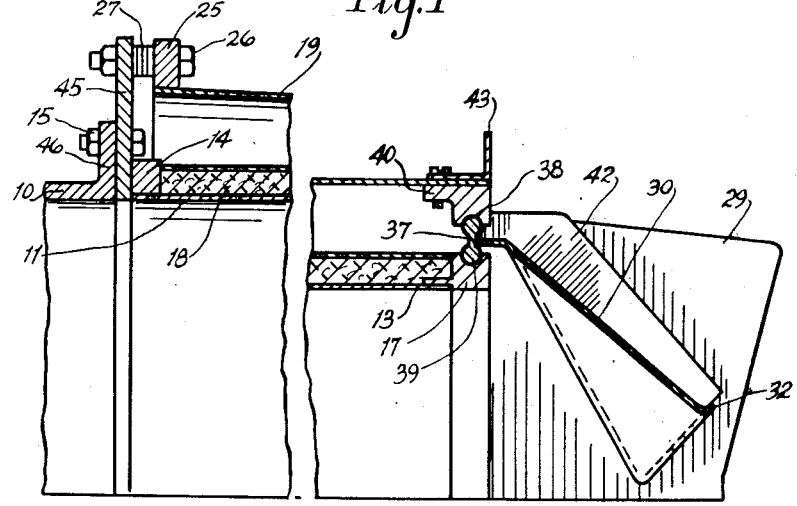
Figure 2 is a fragmentary longitudinal section of Figure 1.
Figure 4:
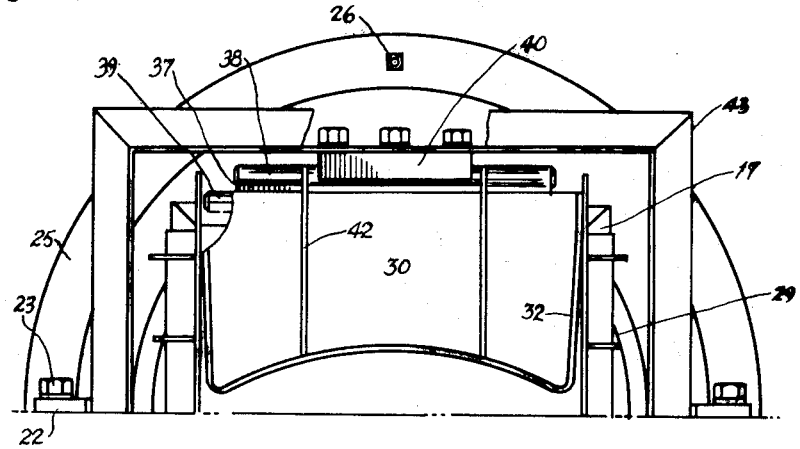
Figure 4 is a half-end view of Figure 1, on an enlarged scale, as seen from right to left in Figure 1.

As already stated, means are provided for automatically varying the effective flow area of the discharge opening, and as shown in Figures 2 and 4, such means include two movable members 30.

In order to resist thermal distortion, the member 30 is formed to present an inner face which is flat at its forward end and of transverse curvature at its rearward end, and its rear and side edges preferably terminate in a curved lip 32, as best seen in Figures 2 and 4. The member 30 is formed with the side edges at a slight angle to the plane of the walls 29, as seen in Figure 4.

The member 30 is mounted for angular displacement on an axis, and its displacement varies as a function of the temperature of the exhaust duct. As shown, the member 30 is integral with a web 37 formed with spaced parallel circular portions 38 and 39 serving in effect as hinge pins. The hinge pins or pivots 39 and 38 are adapted to rotate in a circular recess or bearing formed in the frame 17 and in block 40 respectively. Block 40 is secured to the outer tube 19. As shown this arrangement provides, in effect a bell crank or linkage as part of each of the members 30. Preferably, reinforcing ribs 42 are provided on the outside face of the member 30, and angles 43 secured to the outer shell 19 serve to add rigidity.

The transition duct 11 expands or contracts as the temperature of the gases rises or falls. The outer tube 19 expands or contracts also but its temperature is considerably lower than that of the transition duct. The expansion or contraction of either of the two ducts 11 and 19 is both lengthwise (axial) and transverse (radial) of the respective ducts. For a given axial expansion of the duct 11, the hinge pins 39 will be displaced relatively to the other hinge pins 38, thereby causing the members 30 to be angularly displaced and varying the effective flow area or discharge opening. Likewise, for a given axial contraction of the transition duct, the members will be angularly displaced and decrease the effective flow area or discharge opening. The extent to which the members will be angularly displaced by the expansion or contraction of the transition duct is a function of the distance between the axes of the hinge pins 38 and 39. The angular displacement of the members for a given relative expansion of the ducts 11 and 19 is greater the smaller the distance between the two hinge pins, and vice versa. The angular position of the members 30 can be varied by changing the position longitudinally of the outer tube 19 with respect to the reactor, that is, relatively to the duct 11, by varying the number of shims 27. Thus, if the outer tube is shifted toward the front of the reactor from the position shown in Figure 2, the effective discharge opening will be greater.

The operation of the temperature responsive linkages 37 is effected through hinge pins 39 and 38, by means of the expansion of duct 11 relatively to the outer tube so that the members 30 will be angularly displaced in a direction (from left to right, as best seen in Figure 2) to increase the vertical distance between the outer edges of the members, and therefore increase the effective flow area of the discharge opening.

Figure 5:
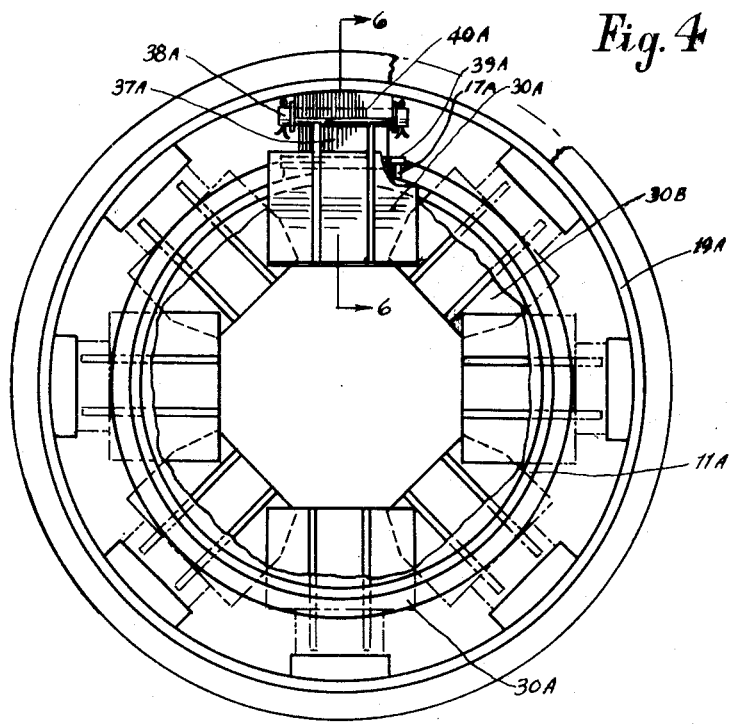
Figure 5 is an end view of another form of the invention.
Figure 6:
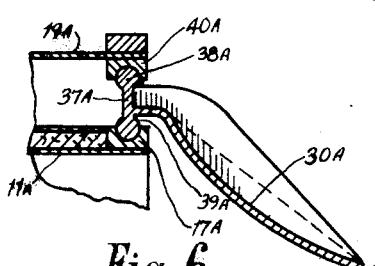
Figure 6 is a section on line 6—6 in Figure 5.

In Figures 5 and 6 is shown another form of the members or flaps which, according to their position, define the effective discharge opening. When the flaps assume the form shown, the ducts 11A and outer tube 19A are circular in cross section instead of tapering to a rectangle. A plurality of overlapping or co-operating members 30A and 30B is used as best shown in Figure 5. A number of such members 30A may be positively actuated or angularly displaced by the differential expansion or contraction of the ducts 11A and 19A, while the other members 30B may be idly suspended and disposed so as to engage the inside faces of the members 30A, the outwardmost angular position of the idling members being determined by their engagement with the positively actuated members 30A. Each such member may be integral with a web 37A formed with hinge portions or pins 39A and 38A journalled in recesses in the block 17A and into blocks 40A carried by the outer duct 19A. For stiffening, member 30A may be provided with a rib or ribs such as 42 in Figure 2.

The members 30A are formed to present a longitudinally curved surface, as best seen in Figure 6. The positively actuated members 30A will be angularly displaced by the movement of the hinge pins 38A and 39A, which in turn are displaced as a function of the differential contraction or expansion of the ducts 11A and 19A.

This invention is applicable to any method of varying the effective flow of the discharge opening that depends upon the movement of the confining elements for the gases flowing through the discharge opening. These elements may comprise plates, vanes, flaps, cones, diaphragms and the like and are caused to move by differential thermal expansion between a hot element of the reactor which is the exhaust duct and a cooler datum such as an outer duct insulated from and surrounding the exhaust duct, through a linkage or rack and pinion between the hot element and the cooler datum. The cooler datum may be a flange of a connection or mounting means for the reactor or any structural member relatively unaffected by the hot gases.

As will be obvious to those skilled in the art, the invention is not limited to the specific embodiment herein shown. Changes and modifications in the invention can be made without departing from its spirit and scope as defined in the following claims:

What I claim is:

1. Means for varying the effective outlet area of the exhaust duct of a reactor comprising an outer member surrounding the exhaust duct and spaced therefrom so as to be substantially less affected by the hot gases passing through the exhaust duct than the duct itself, and a plurality of flaps extending rearwardly of said exhaust duct, the forward ends of said flaps being mounted between said exhaust duct and said outer member, the means for mounting the forward ends of at least two of said flaps comprising a pivotal connection between the flap and the outer member and a second pivotal connection between the flap and the exhaust duct, whereby differential expansion and contraction of the outer member and exhaust duct will cause rotation of the rearwardly extending flaps about their forward ends thereby varying the effective outlet area of the exhaust duct.

2. Means as defined in claim 1, in which the rearward portions of said outer member and said exhaust duct are of rectangular cross-section, and in which there are only two flaps, said flaps being of substantially the same width as the exhaust duct and being mounted for rotation about substantially parallel axes.

3. Means as defined in claim 1, in which a layer of insulating material is interposed between said exhaust duct and said outer member.

4. Means as defined in claim 1, in which the rearward portions of said outer member and said exhaust duct are of circular cross-section, and in which there are at least four of said rearwardly extending flaps, said flaps being mounted substantially equidistantly from one another around the annulus formed between the rearward portion of said duct and said outer member.

5. Means as defined in claim 4, in which certain of said flaps are idly mounted and the movement of the idly mounted flaps is controlled by the movement of said at least two flaps having the two pivotal connections.

J. FEATONBY.

References Cited in the file of this patent

UNITED STATES PATENTS

| Number | Name | Date |
|---|---|---|
| 795,448 | McGonagle | July 25, 1905 |
| 2,569,497 | Schiesel | Oct. 2, 1951 |
| 2,575,879 | Lombard | Nov. 20, 1951 |